United States Patent [19]
Hagen

[11] Patent Number: 5,982,173
[45] Date of Patent: Nov. 9, 1999

[54] METHOD OF CHARACTERIZING AND COMPENSATING FOR READ HEAD NONLINEARITY IN A DISK DRIVE

[75] Inventor: Mark David Hagen, Rochester, Minn.

[73] Assignee: Western Digital Corporation, Irvine, Calif.

[21] Appl. No.: 09/003,388

[22] Filed: Jan. 6, 1998

[51] Int. Cl.⁶ ............................. G01R 33/12; G11B 5/596
[52] U.S. Cl. ...................... 324/212; 324/202; 360/77.04
[58] Field of Search .................................. 324/212, 202, 324/210, 213, 252, 260, 225; 360/104–109, 131, 77.02, 77.04, 77.05, 77.08, 135; 73/1.01; 250/252.1

[56] References Cited

PUBLICATIONS

"A Nonlinearity Specification for Constructing the Servo Position Error Signal" by Evert Cooper, Member, IEEE; *IEE Transactions on Magnetics,* vol. 33, No. 2, Mar. 1997; pp. 1104–1115.

*Primary Examiner*—Jay Patidar
*Attorney, Agent, or Firm*—Leo J. Young, Esq.; Milad G. Shara, Esq.

[57] ABSTRACT

A method is disclosed for calibrating a position error signal (PES) to overcome the problem of an amplitude signal that varies as a non-linear function of real displacement when the read transducer is positioned to either side of a null position where the PES equals zero. The amplitude signal and resulting PES is notably nonlinear while reading servo burst information with a Magneto-Resistive (MR) head which has nonlinear magnetic characteristics. The calibration according to this method may be performed at anytime without need for real displacement information from a servo track writer or any sort of special calibration track. The method involves positioning the MR head to a plurality of nominal partial track displacements on either side of the null position, measuring an open loop gain value for a particular frequency at each of the displacements, deriving the coefficients of a $3^{rd}$ order polynomial "gain" curve that best fits the data, integrating the "gain" curve using the coefficients to obtain a $4^{th}$ order "position" curve, and then correcting subsequent measured displacements. If sufficient memory is available, the x, y values may be stored in a lookup table. The correction is preferably accomplished, however, by "inverting" the $4^{th}$ order position curve through a process of establishing a plurality of "x, y" values, swapping the axes of such values, and then fitting a new polynomial to the transposed data.

17 Claims, 11 Drawing Sheets

|   | (A-B) OFFSET FROM SEAM #1 | (C-D) OFFSET FROM SEAM #2 | (A-B) OFFSET FROM SEAM #3 | (C-D) OFFSET FROM SEAM #4 |
|---|---|---|---|---|
| 1 | -0.24 | -0.222 | -0.204 | -0.187 |
| 2 | -0.169 | -0.151 | -0.133 | -0.116 |
| 3 | -0.098 | -0.08 | -0.062 | -0.044 |
| 4 | -0.027 | -0.009 | 0.009 | 0.027 |
| 5 | 0.044 | 0.062 | 0.08 | 0.098 |
| 6 | 0.116 | 0.133 | 0.151 | 0.169 |
| 7 | 0.187 | 0.204 | 0.222 | 0.24 |

|   | (A-B) | (C-D) | (A-B) | (C-D) |
|---|---|---|---|---|
|   | OFFSET COMMAND FOR EACH LOCATION | | | |
| 1 | -4041 | -1214 | 1614 | 4442 |
| 2 | -3653 | -825 | 2002 | 4830 |
| 3 | -3265 | -437 | 2391 | 5219 |
| 4 | -2876 | -49 | 2779 | 5607 |
| 5 | -2488 | 340 | 3168 | 5995 |
| 6 | -2100 | 728 | 3556 | 6384 |
| 7 | -1711 | 1117 | 3944 | 6772 |

Firmware compensation implementation

```
    #define trkScale         8192;         // use 3,13
    scaling
    #define halfTrack        trkScale*0.5; //

PESgainOff = getGainOff(head,zone);    // PES gain
    from cal routine
    PESgainSlope = getGainSlope(head,zone);
    PEScomp3 = getPEScomp3(head);          // PES
    compensation coefficients
    PEScomp2 = getPEScomp2(head);
    PEScomp1 = getPEScomp1(head);

cyl = getTID();                        // read in
    14 bit track ID

PESgain = PESgainSlope*cyl + PESgainOff; // calc
    bulk gain for this track

A = getburstA();                       // read in
    10 bit ADC values,
    B = getburstB();
    C = getburstC();
    D = getburstD();
    CsubD = C-D;
    AsubB = A-B;

if ( |CsubD| <= |AsubB| ) {            // Use C-D
       P = PESgain * CsubD/(C+D);  // normalized PES in
    3.13 tracks if (AsubB > 0)                      // if cyl is
    odd, invert pos
          P = -1*P;

P = (((linComp3)*P + linComp2)*P + linComp1)*P +
    linComp0;
    }
    else {                                 // Use A-B
       P = PESgain * AsubB/(A+B);  // normalized PES in
    3.13 tracks
```

FIG. 10A

METHOD OF CHARACTERIZING AND COMPENSATING FOR READ HEAD NONLINEARITY IN A DISK DRIVE

BACKGROUND OF THE INVENTION

1. Field of the Invention

The present invention relates generally to rotating magnetic disk drives and, more particularly, to a method of calibrating a position error signal (PES) for accurately moving an MR head in partial track increments from a position at which the PES equals zero and where the PES varies as a nonlinear function of real displacement due to a non-linear magnetic response characteristic of the MR head.

2. Description of the Related Art

A conventional disk drive has a head disk assembly ("HDA") including at least one magnetic disk ("disk"), a spindle motor for rapidly rotating the disk, and a head stack assembly ("HSA") that includes a head gimbal assembly (HGA) with a transducer head for reading and writing data. The HSA forms part of a servo control system that positions the transducer head over a particular track on the disk to read or write information from that track.

The industry presently prefers a "rotary" or "swing-type" actuator assembly which conventionally comprises an actuator body that rotates on a pivot assembly between limited positions, a coil that extends from one side of the actuator body to interact with a pair of permanent magnets to form a voice coil motor, and an actuator arm that extends from the opposite side of the actuator body to support the HGA.

Each surface of each disk conventionally contains a plurality of concentric data tracks angularly divided into a plurality of data sectors. In addition, special servo information is provided on this disk or another disk to determine the position of the head. The most popular form of servo is called "sampled servo" or "embedded servo" wherein the servo information is written in a plurality of circumferentially successive servo sectors that are angularly spaced from one another and interspersed between data sectors around the track. Each servo sector generally comprises a track identification (ID) field and a group of servo bursts (an alternating pattern of magnetic transitions) which the servo control system samples to align the transducer head with or relative to a particular data track. The servo control system moves the transducer toward a desired track during a coarse "seek" mode using the track ID field as a control input. Once the transducer head is generally over the desired track, the servo control system uses the servo bursts to keep the transducer head over that track in a fine "track follow" mode. The transducer generally reads the servo bursts to produce a position error signal (PES) that is 0 when the transducer is at a particular radial position. The position where the PES=0 may or may not be at the data track center, however, depending on the magnetic characteristics of the transducer, the arrangement of the servo bursts, and the formula used to calculate the PES.

For many years, the industry has used single-gap inductive thin film heads where the same transducer or gap is used for reading and writing. More recently, however, the industry has begun using a Magneto-Resistive (MR) head which requires two separate transducers—an inductive transducer for writing and a Magneto-Resistive transducer for reading. An MR head offers an advantage over an inductive head in the recovery of data in disk drives requiring high areal density. However an MR head also presents a number of disadvantages. In particular, the separate read and write transducers are necessarily spaced apart from one another along the length of the supporting structure known as a "slider." As a result, their radial separation varies as the head is moved over the disk by a swing-type actuator.

This phenomenon generally requires distinct track following procedures for reading and writing. For example, during writing the read transducer track follows at the "null" position where the PES=0 and the write transducer records the data track offset by the amount of radial separation between the read and write transducers at this cylinder. For reading, therefore, the read transducer is "micro-jogged" away from the null position in order to align the read transducer with the data track, i.e. it track follows off-null at a position where the PES≠0.

The jogging process can be troublesome, however, because the PES produced by the Magneto-Resistive transducer does not vary in linear proportion to the displacement from the position where the PES=0. This non-linear signal-to-displacement characteristic is a well known problem, but the solutions to date have a number of drawbacks as discussed below.

One known approach to calibrating the PES signal relative to displacement relies on a device called a servo track writer (STW). The STW is a manufacturing fixture used to write servo track information on the surfaces of disks in an HDA. The STW mechanically moves the actuator to a given reference position precisely measured by a laser interferometer. The HDA is then driven to write the servo track information for that position. The servo track writing process of precisely measured displacement and servo track writing is repeated to write all required servo tracks across the disk. During this process, the precise measurement of actual position can be used to characterize the PES read by the HDA's servo controller. This makes it relatively easy to measure the system gain for each head as a function of the actual displacement x and thereby generate a calibration factor. Unfortunately however, a STW is a very expensive piece of machinery, costing $100,000 or more, and using this process for calibrating system gain increases the time spent by the HDA in a STW which adversely impacts production time and cost. Finally, it is undesirable to calibrate the PES using a servo track writer because the calibration must be performed before the detailed self calibration process which the disk drive performs later in the manufacturing cycle. This is a significant disadvantage because the parameters of the servo channel may change due to adjustments in DC bias current applied to the MR transducer or other factors. Accordingly, the calibrations made with the servo track writer may become inaccurate or entirely invalid.

Another approach known to this inventor involves using the servo track writer to record special "calibration tracks" on each surface of each disk wherein a plurality of burst pairs define null points that are radially shifted from one another by precise, fractional track amounts that collectively provide accurate information about real displacement. Such calibration tracks beneficially allows for calibrating the PES signal after the drive is removed from the servo track writer. Unfortunately, however, the special calibration tracks take additional time on the servo track writer and occupy valuable space on the disk that could be used for data.

Accordingly, there is a need for a method of calibrating the response of the MR head which does not require a servo track writer and which may be performed when the disk drive requires detailed calibration without requiring special calibration tracks.

SUMMARY OF INVENTION

The present invention may be regarded as a method of characterizing the non-linearity of a head in a magnetic disk drive having a rotating recording surface, wherein the head is positioned by a sampled servo positioning system in which each recording surface has multiple circumferentially successive servo wedges that each have a sequence of servo bursts, wherein during track following operations the head produces an amplitude signal when a portion of a servo burst passes under the head in order to provide a component of a position error signal, and wherein the amplitude signal produced by the head varies non-linearly with position as the head is positioned over differing portions of the servo burst, the method comprising positioning the head at a plurality of off-track positions relative to a burst pair centerline of a pair of servo bursts; measuring the open loop gain for each of the plurality of off-track positions to provide a distribution of open loop gain values; determining a first plurality of coefficients of a first polynomial equation of order (n) that approximates the distribution of open loop gain values corresponding to the off-track positions wherein (n) is an integer of at least magnitude 2; integrating the first polynomial equation of order (n) to produce a second polynomial equation of order (n+1) that approximates position error as a function of off-track position; and finding a third polynomial equation of order (n+1) to provide off-track position as a function of demodulator output.

The present invention may also be regarded as residing in a disk drive having a sampled servo head positioning system including a processor, a memory, a head, a rotating recording surface wherein each recording surface has multiple circumferentially successive servo wedges that each have a sequence of servo bursts, wherein during track following operations the head produces a burst amplitude signal when a portion of a servo burst passes under the head in order to provide a component of a position error signal, and wherein the burst amplitude signal produced by the head varies non-linearly with position as the head is positioned over differing portions of the servo burst, wherein the invention is a method of correcting for the nonlinear variation of the burst amplitude signal comprising providing a plurality of compensation coefficients $a_n \ldots a_1$ of a polynomial compensation equation $x(P)=a_n P^n + \ldots + a_1 P$ of order (n) that produces a corrected off-track position x as a function of a nominal position error signal P; obtaining the nominal position error signal P based on at least two burst amplitude signals; determining the corrected off-track position x corresponding to the nominal position error signal P by solving the polynomial equation x(P) using the nominal position error signal P; and applying the corrected off-track position to the sampled servo head positioning servo system to position the head to follow a track at a desired off-track position relative thereto.

BRIEF DESCRIPTION OF THE DRAWINGS

The just summarized invention may best be understood with reference to the Figures of which:

FIG. 10A is a source code representation of the firmware that compensates for nonlinearity using a $3^{rd}$ order polynomial as represented by FIG. 10;

BRIEF DESCRIPTION OF THE PREFERRED EMBODIMENTS

Figure 1:
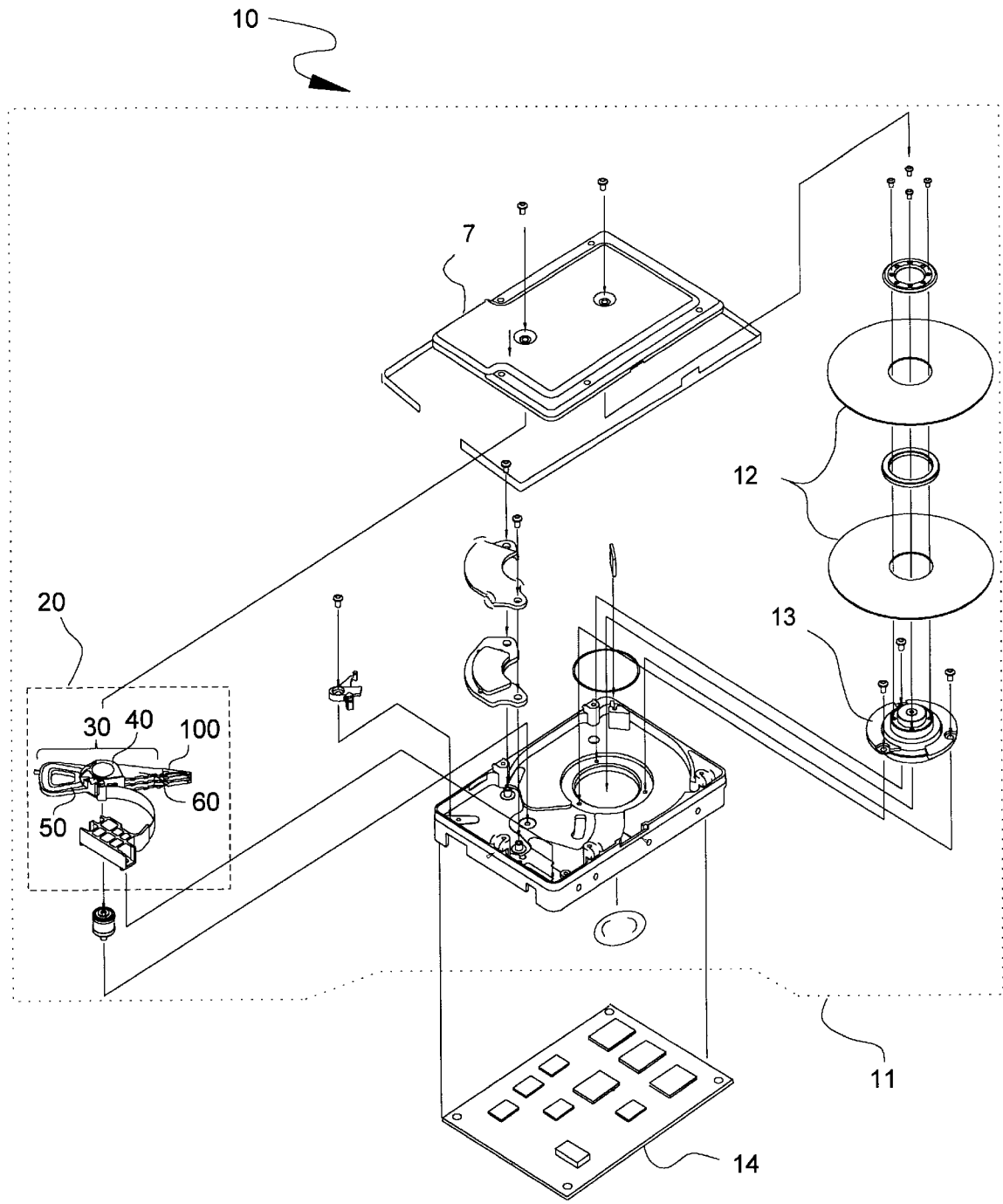
FIG. 1 is an exploded perspective view of a magnetic disk drive 10 having a head disk assembly 11 ("HDA") including a head stack assembly 20 ("HSA") which carries a Magneto-Resistive transducer over concentric data tracks, servo tracks, and associated servo bursts on the surface of a disk 12.

FIG. 1 shows the principal components of a disk drive 10 in which a PES calibration according to the present invention may be implemented. The disk drive 10 comprises a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 comprises a swing-type actuator assembly 30 having a voice coil 50, an actuator body 40, and an actuator arm 60. At least one head gimbal assembly 100 extends from each actuator arm 60 and carries a transducer head 120 (see FIG. 2A) over the disk 12.

The head stack assembly 20 is located so that the head 120 of the head gimbal assembly 100 is biased towards and moveable over the disk 12. The HDA's storage capacity may be increased, as shown in FIG. 1, by including several disks 12 and a head stack assembly 20 having a vertical "stack" of head gimbal assemblies 100 and associated heads 120 for each surface of each disk 12, the head gimbal assemblies 100 supported by multiple actuator arm 60.

Figure 2:
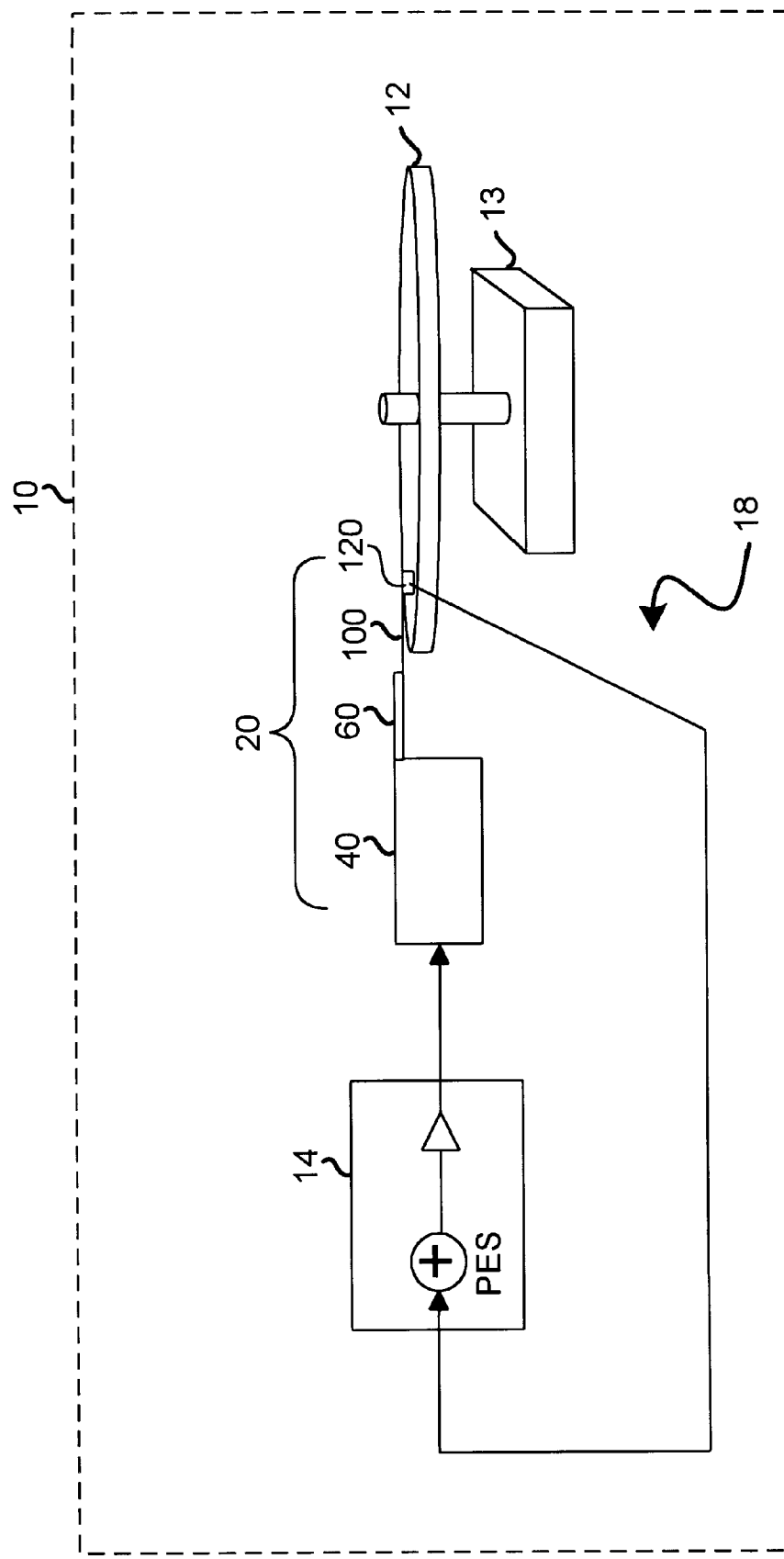
FIG. 2 is a schematic, block diagram of a servo control loop 18 used to position a transducer head 140 over a surface of a disk 12 in the disk drive of FIG. 1.

FIG. 2 is a schematic, block diagram of a servo control loop 18 used to position a transducer head 120 over a surface of a disk 12 in the disk drive 10 of FIG. 1. As suggested therein, servo electronics within the controller circuit board 14 control the actuator 20 based on servo signals fed back from the transducer head 120. A detailed description of the servo control loop is unnecessary because its general operation is well known in the industry.

As explained above, a sampled servo or sectored servo system is presently popular. In such an arrangement, groups or "bursts" of magnetic transitions are recorded in a circumferentially radially and successive fashion within a servo sector. In the simplest arrangement, two bursts are used per data track. The servo track and data track centerlines are coincident in this arrangement. The bursts are usually designated as the "A" burst and the "B" burst. The A burst is radially displaced to one side of the data track centerline and the B burst is displaced to the other side. The A and B bursts are also circumferentially displaced from one another in terms of angular position such that the head passes over the A burst and then over the B burst. If the head is aligned with the servo track and data track centerline, then the head will pass over equal amounts of the A and B bursts and the servo electronics will develop a Position Error Signal (PES) equal to zero. If the head is displaced from the centerline, then the head will pass over more of the A burst or over more of the B burst so that the PES will be nonzero, the sign of the PES indicating the direction of displacement. The PES is used by the servo electronics to attain and then maintain a desired position.

The separation of the read and write transducers in a Magneto-Resistive heads and development of servo patterns with servo seams that do not align with data track centerlines has made it necessary to purposely track follow away from the null position where the PES=0. Unfortunately, however, the Magneto-Resistive read transducer which detects the servo bursts is nonlinear in that the amplitude signal used to derive the measured displacement (PES) does not correspond to real displacement as the read transducer is moved away from the null point. This nonlinear response makes it necessary to calibrate the PES as a function of real displacement in order to accurately position the MR head on either side of the null position. A unique feature of this inventor's calibration method is that it does not require any knowledge of real displacement, but rather is accomplished by measuring the open loop gain for a particular frequency at each of a plurality of commanded positions relative to one or more servo seams. The method may be understood with reference to the following sections taken together with the drawings.

Figure 3:
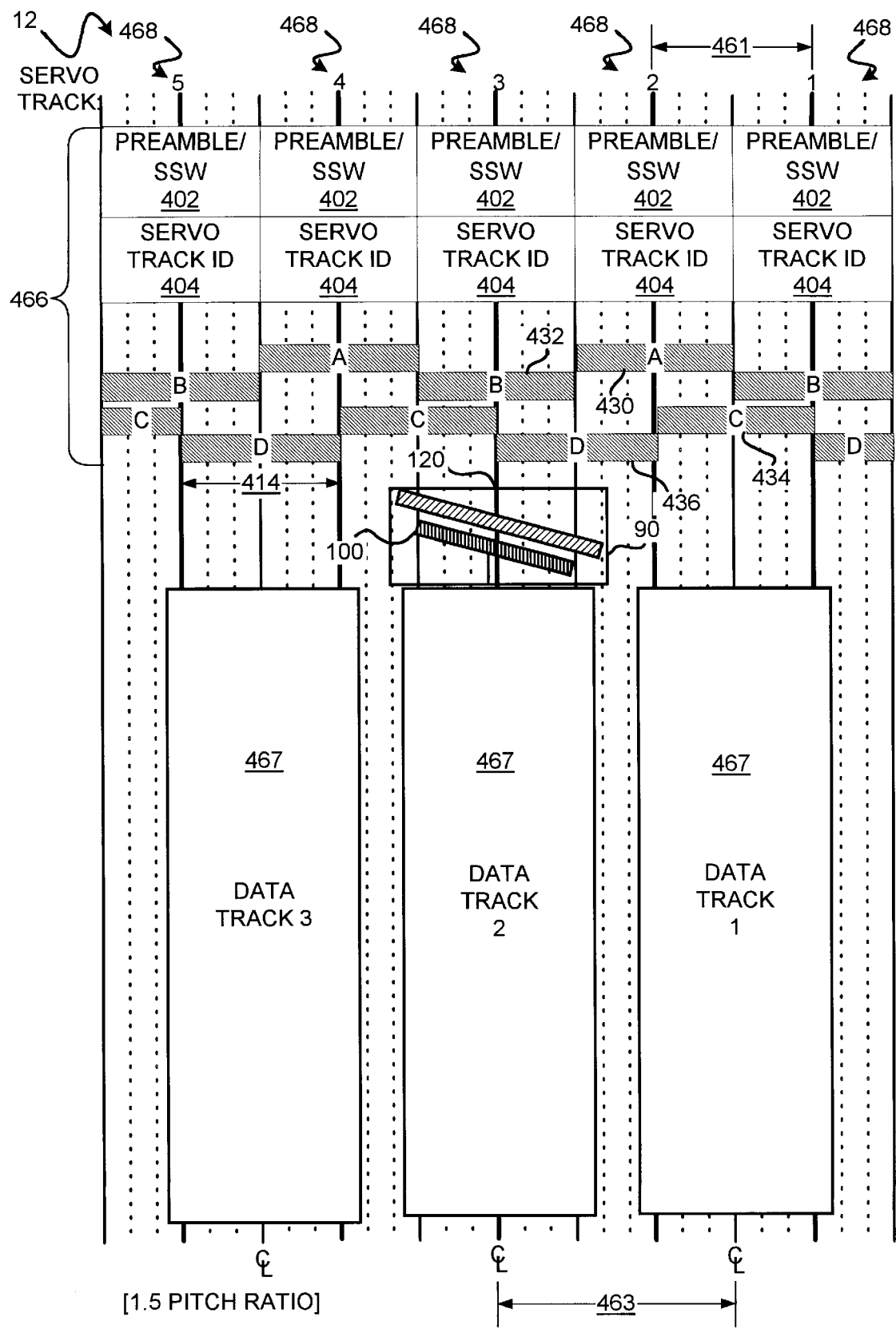
FIG. 3 is a track diagram of the servo track and data track structure of a disk drive having a 1/3, 1/3, 1/3 pattern of 2/3 wide servo bursts.

FIG. 3 shows a disk 12 having a more complicated servo track structure that results in a ratio of 1.5:1 between the data track pitch and the servo track pitch. In this particular arrangement, the servo bursts are 2/3 of a data track wide and are written in 1/3 data track offsets. This is sometimes called a 1/3, 1/3, 1/3 pattern. Each servo track 468 labeled 1,2,3,4,5 has a Preamble/SSW field 402 and a servo track identification field 404. Servo track identification field 404 is encoded using a Gray code in a well known manner to ensure that track identification can be read even though a head may be straddling two tracks.

Each servo track 468 further has a sequence of servo bursts 430, 432, 434, and 436 labeled A, B, C and D. In this case the transducer head 120 includes a Magneto-Resistive read head 100 that leads an inductive write head 90. The width of the read head 100 and a non-uniformity of sensitivity across that width ("read profile") largely determine a linear signal resolution range which describes the ability of the servo controller and a read channel, comprising a preamplifier in HSA 20 and signal processing logic in PCBA 14, to associate an increment of radial transducer displacement with a linear increment of electrical signal when reading servo bursts. The servo bursts 430, 432, 434, and 436 are written by a servo track writer with a width 414 that is constrained to approximate the linear signal resolution range driven by the width of the read head 100. A further determinant of linear signal resolution range can be a calibration of read head 100 sensitivity which may provide means for extending the useful linear signal resolution range by establishing its response at varying positions above the servo bursts and providing a correction factor.

The servo tracks 468 are spaced apart by a servo track pitch: spacing 461 indicates the servo track spacing between servo track 1 and 2 for example. In FIG. 3, the data track pitch 463 is not synonymous with servo track pitch 461 because there are 1.5 servo tracks per 1 data track. The data tracks 467 may even be arbitrarily spaced apart relative to the servo tracks as disclosed by this inventor in pending U.S. patent application Ser. No. 08/918,025.

The present invention offers a method for developing a lookup table or a mathematically equivalent plurality of linearity compensation coefficients that are used by the servo firmware to correct for errors in the PES that are caused by the non-uniformity of the read profile of the read head.

Measurement and Calculation of Coefficients

The process of determining the PES linearity compensation coefficients is done by measuring the open loop gain of the servo loop 18 for various off-track locations. These gain measurement values are integrated and scaled to generate a set of position values. Then a 3rd order polynomial is fit to these position values. The coefficients of the 3rd order polynomial are then stored in the reserved image (an area of the disk which is dedicated to the controller firmware and "hidden" from the host computer) of the drive.

Open Loop Gain Measurement

Figures 4, 5, 6:
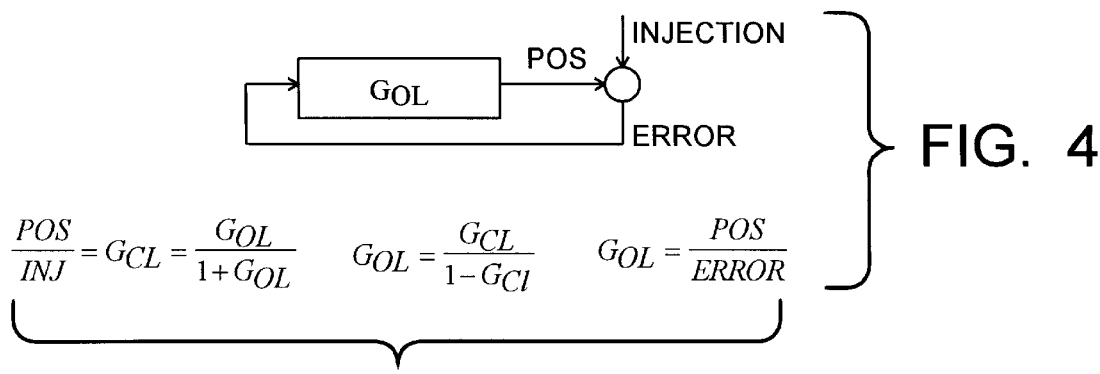
FIG. 4 is a system level diagram of the servo control loop of FIG. 2 showing how the open loop gain for a particular frequency may be determined by injecting a small signal of known amplitude at that frequency.
FIG. 5 is a table specifying four sets of seven off-track locations that provide a well dispersed distribution of off-track positions that vary between −0.24 and +0.24 relative to four adjacent burst pair centerlines, servo tracks or servo "seams" that may be repeated to form the overall servo burst pattern.
FIG. 6 is a table specifying the offset command for corresponding off-track locations in the table of FIG. 5 and relative to an initial seek to Seam #2.

As shown in FIG. 4, we can determine the open loop gain of the read head 100 for a particular frequency by injecting a sine wave of that frequency and of known amplitude into the control loop 18. We arrive at the open loop gain of the read head 100 by measuring the closed loop gain of the entire control loop 18. Accordingly, the sine wave should be of small amplitude so that any variation in closed loop gain is due only to the non-uniform read profile of the read head 100.

The preferred sine wave is 2% of a servo track pitch in amplitude and has a frequency of 540 Hz. As suggested by FIG. 4, we inject the sine wave into the control loop at the demodulator output and measure the 540 Hz content of the resulting position error. We chose 540 Hz because it is not a disk harmonic such that written-in content will not drown out the measurement (540 Hz is 4½ times the spindle frequency) and because 540 Hz is in a relatively flat part of the frequency response of the central loop so that gain is unlikely to change for reasons unrelated to linearity error in the head. Another frequency could work equally as well provided that there is sufficient measurement sensitivity at that frequency. From this error, the effective closed loop gain can be measured.

$$\frac{pos}{inj} = G_{CL} = \frac{G_{OL}}{1+G_{OL}}$$

From the closed loop gain, the open loop gain can be calculated:

$$G_{OL} = \frac{G_{CL}}{1-G_{Cl}} \text{ or } G_{OL} = \frac{pos}{error}$$

The linearity error should be about the same for equal displacements from each burst pair centerline. There may be a servo pattern dependency, however, due to the fact that different burst pair centerlines involves different burst pair edges or are otherwise slightly different. Accordingly, a single set of linearity compensation coefficients are preferably developed for a sequence of servo bursts that form the smallest repeating part of the servo pattern in question.

Given a 1/3, 1/3, 1/3 servo pattern like that shown in FIG. 3, for example, the servo track writer records 4 servo tracks before the pattern repeats. This corresponds to a width of 2 servo tracks pitches or 1.5 data tracks pitches. In this particular case, therefore, the preferred system develops an average set of compensation values for each head using off-track gain measurements taken across 4 servo tracks. Additionally, to account for variations related to head skew and changes in response due to changes in linear bit density, the measurements are preferably made across multiple servo track groups at, for example, 5 locations on each surface.

In the preferred embodiment, gain is measured at 7 off-track locations relative to each of the four adjacent servowritten tracks and without commutating to nearby servo tracks during such measurement in order to avoid any large changes in gain that are not related to the linearity of the head. If we perform this process at five locations on each surface, we develop a total of 140 measurement locations for each surface (4×7×5=140).

Figure 7:
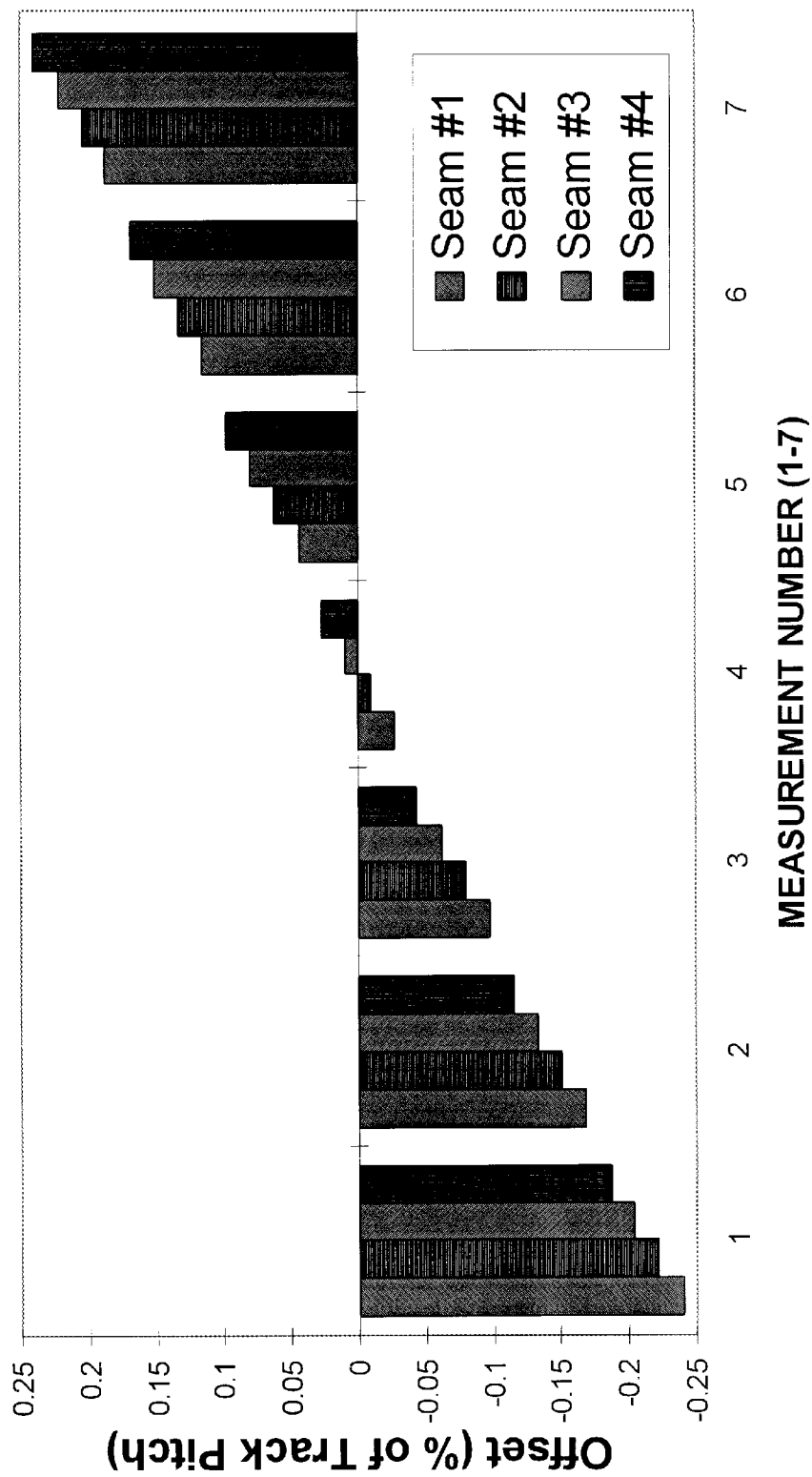
FIG. 7 shows how the twenty-eight off-track positions from the table of FIG. 5, measured relative to four adjacent servo seams, are distributed between approximately −0.24 and +0.24 when superimposed across one hypothetical servo seam.

FIG. 5 is a table specifying the seven off-track locations that are defined relative to four adjacent servo tracks. The off-track locations were selected in order to provide a well dispersed distribution of off-track positions relative to four successive burst pair centerlines which, when combined, interlace to vary between −0.24 and +0.24. This is perhaps best illustrated by FIG. 7 which shows how the twenty-eight off-track positions from the table of FIG. 5, measured relative to four adjacent servo seams, are distributed between approximately −0.24 and +0.24 when superimposed across one hypothetical servo seam.

In this particular embodiment, the gain curve rolls off as the head is positioned farther from the servo track center. As the gain drops, measurement error increases. This is particularly noteworthy because, as noted above, we do not permit commutation to a nearby burst pair centerline. The system is measuring gain by injecting a 2% sine wave at a frequency where the gain is greater than 1. Accordingly, the head nominally positioned at ±0.25 servo tracks is moving as far out as about ±0.27 servo tracks. Without commutation, the servo control system will lose control somewhere between about 0.30 and 0.50. The inventor chose to gather gain values between ±0.24 servo tracks in order to maintain stability and measurement SNR but, the present invention provides linearity compensation coefficients that permit later extrapolation to off-track positions of ±0.25 servo tracks and beyond.

FIG. 6 is a table specifying the offset command for corresponding off-track locations in the table of FIG. 6 and relative to an initial seek to Seam #2. These offset commands assume 8192 counts per data track and servo bursts that are 2/3 of a data track wide. Through careful review of FIG. 6, going from top to bottom and left to right in each column, it can be seen that the 28 offset commands are all derived relative to the initial seek to Seam #2. In practice, however, the 28 track offset commands of FIG. 6 are implemented in a special way due to the lack of commutation while actually taking the gain measurements. In order to develop the values associated with Seam #1, for example, we first move the actuator to the center of Seam #1 to make sure the commutator logic selects the appropriate burst pair (e.g. A–B), turn off commutation to avoid gain jumps, move to the outside of Seam #1 (−4041), and then step down the column and across Seam #1. After that, we tun on commutation, move to the center of Seam #2 so that the commutator logic selects the appropriate burst pair (e.g. C–D), turn off commutation, move to the outside of Seam #2 (−1214), and then step down the column and across Seam #2. The same process is then repeated for Seam #3 and Seam #4.

Deriving Compensation Values From Gain

A first equation defining open loop gain G as a function of position x is developed by making appropriate measurements. A second equation defining the demodulator output P as a function of position x is then calculated by integrating the first equation. Finally, for purposes of compensation, the second equation P(x) is used to create a lookup table or, preferably, to create a third equation defining position x as a function of demodulator output P.

We develop the first equation by fitting the gain measurements to a least squared error polynomial where the gain measurements are the "y" values and the off-track actuator locations across the servo tracks are the "x" values:

$$G(x)=g_{n-1}x^{n-1}+ \ldots +g_2x^2+g_1x+g_0$$

The polynomial should be of at least $2^{nd}$ order so that it approximates the inverted parabolic shape of the sensitivity profile or read profile of the read head 100. The preferred polynomial is of 3rd order as represented below, however, since this is the least complex polynomial that can account for the fact that the read profile is asymmetrical:

$$G(x)=g_3x^3+g_2x^2+g_1x+g_0$$

The gain coefficients of the best fit polynomial can be computed using conventional matrix math, as follows:

for Ag=P where $$A=[x^3\ x^2\ x^1\ 1]$$

$$g=\text{inv}(A^TA)A^TP$$

contains the polynomial coefficients

Note that the "x" values in the A vector never change and can be computed in advance.

Figure 8:
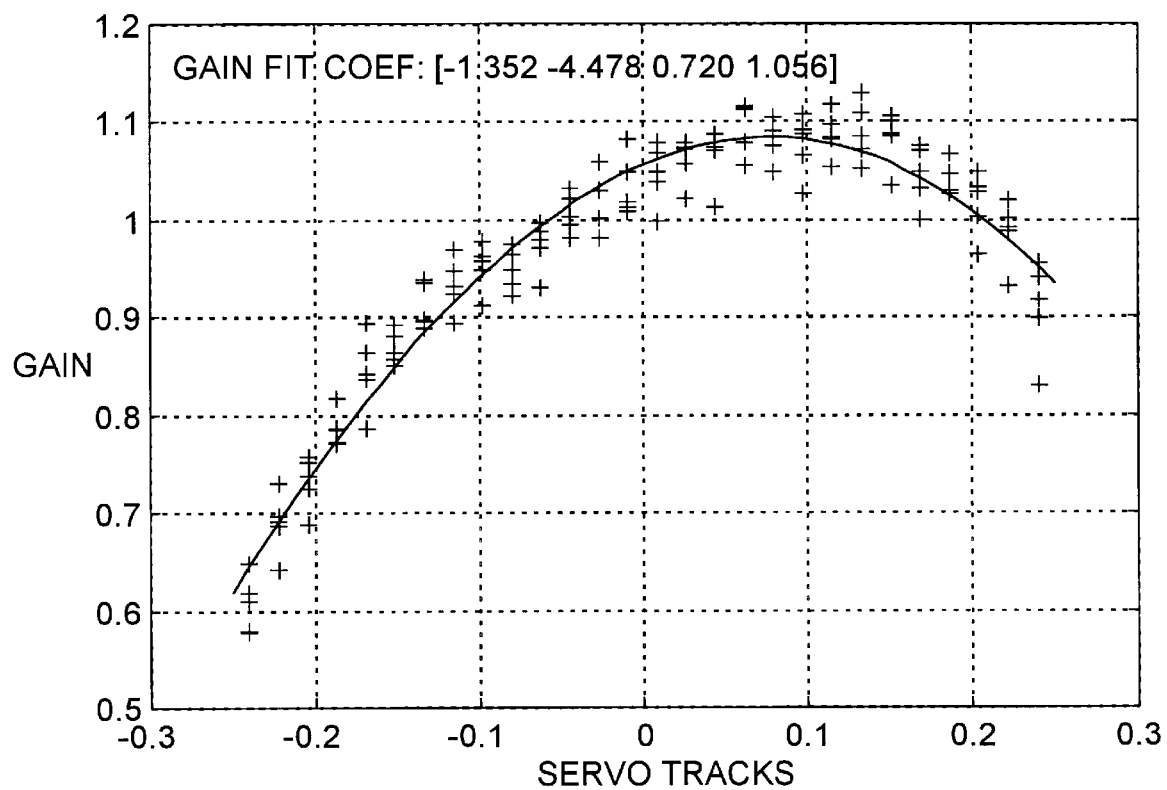
FIG. 8 is a plot showing 140 (7×4×5) open loop gain measurements made from five groups of four adjacent servo seams superimposed across one hypothetical servo track and a $3^{rd}$ order polynomial "gain" curve that best fits the data according to a least square error method.

FIG. 8 shows the 140 data points superimposed across one servo track and the resulting best fit 3rd order polynomial G(x) that provides the measured open loop gain of the entire control system as a function of actuator position. In this particular case, the gain coefficients were calculated as described above and the fully qualified polynomial equation is:

$$G(x)=(-1.352)x^3+(-4.478)x^2+(0.720)x+(1.056)$$

We now have a polynomial representation of the gain G as a function of position x, but what we need is a representation of actuator location x as a function of the demodulator output P. We can easily get half way there by computing the integral of the gain polynomial, i.e.:

$$P(x)=\int G(x)dx$$

Since the gain polynomial is 3rd order, the polynomial representing the demodulator output P as a function of position x is $4^{th}$ order:

$$P(x) = \frac{1}{4}g_3x^4 + \frac{1}{3}g_2x^3 + \frac{1}{2}g_1x^2 + g_0x + c_0$$

P(x) is the estimated demodulator output P as a function of actuator position. For our purpose, however, P(x) must be scaled to units of tracks using a scale factor "sf", i.e.

$$P(x) = sf\left(\frac{1}{4}g_3x^4 + \frac{1}{3}g_2x^3 + \frac{1}{2}g_1x^2 + g_0x + c_0\right)$$

We scale P(x) by noting that the servo pattern repeats for each servowriter track. That is, it repeats every 0.5 servo tracks. Also, since the "bulk" gain is calculated at the commutation points and these points are at approximately ±0.25 servo tracks from the P=0 point, we know how much P(x) should vary as the head moves between the +0.25 and −0.25 servo track points and what P(x) should be when the head is at the +0.25 point, namely:

$$0.5=P(0.25)-P(-0.25);$$

and $$0.25=P(0.25)$$

From these two equations, we can solve for the two unknowns comprising the scale factor "sf" (slope) and the constant $c_0$ (offset). After doing the math, the scale factor sf and offset $c_0$ that scale the integrated gain measurements to units of tracks are then:

$$sf = \frac{48}{g_2 + 48g_0}$$

$$c_0 = \frac{-g - 32g_1}{1024}$$

Given the original gain values shown in FIG. 8 and the values for sf and $c_0$ derived above, the fully qualified polynomial P(x) that describes demodulator output P as a function of position x is:

$$P(x)=(-0.351)x^4+(-1.551)x^3+(0.374)x^2+(1.097)x+(-0.022)$$

Figure 9:
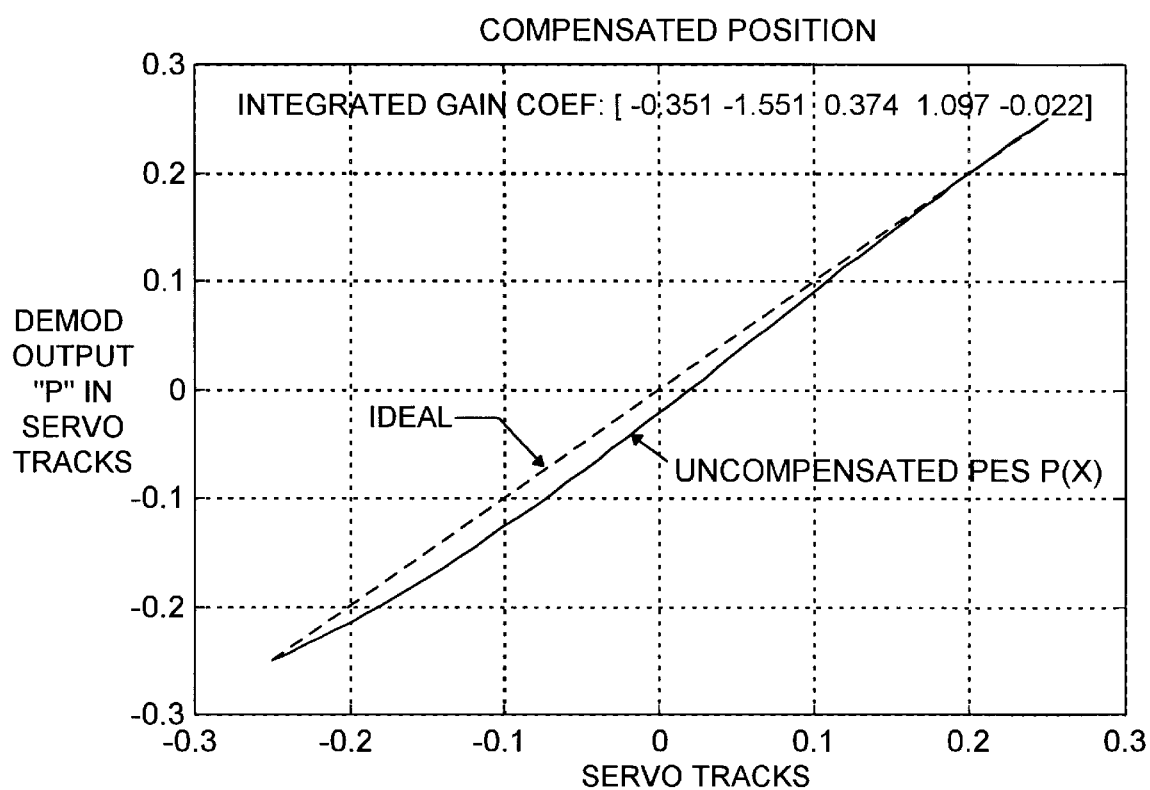
FIG. 9 is a graph of a $4^{th}$ order polynomial "position" curve that is the integral of the "gain" curve of FIG. 8 and has been scaled to conform to the boundaries defined by commutation points at ±0.25 servo tracks.

FIG. 9 depicts the appearance of this particular polynomial for servo track positions between −0.25 and +0.25.

After integrating and scaling the demodulator output P values, we have the second equation as a polynomial P(x) that gives us an accurate description of demodulator output P as a function of actuator position x. But what we really need in the firmware is just the opposite, i.e. an description of actuator location X as a function of demodulator output P. To achieve this, we need to swap the axes of the data in FIG. 9. We can do this in at least two different ways.

Figure 10:
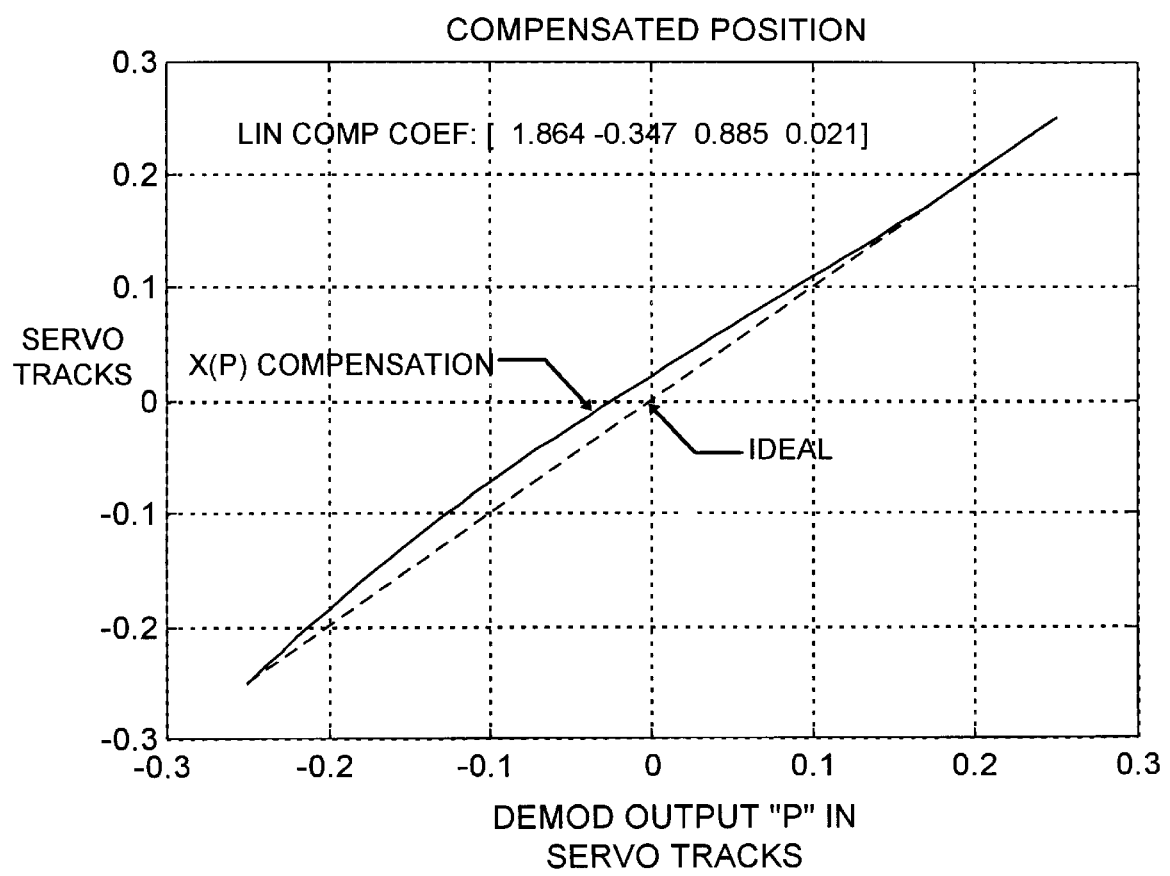
FIG. 10 is a graph of a $3^{rd}$ order polynomial "correction" curve that is an "inversion" of the position curve of FIG. 9 in that "x" and "y" axes have been swapped to allow for correction of nominal position error P by providing actual off-track position x as a function of nominal position error P.

If memory is plentiful, we can populate a lookup table stored in memory by choosing a set of actuator locations x and make these the "y" values and calculate a corresponding set of "x" values using P(x). The resulting lookup table would look something like FIG. 10.

If we do not have sufficient memory resources for a lookup table, but we do have a powerful, high speed DSP, then we can do another 3rd order fit after we swap the axes. In other words, as before, we choose a set of actuator locations x and make these the "y" values and calculate a corresponding set of "x" values using P(x) to temporarily generate a set of "x, y" values that again define a curve like that shown in FIG. 10. At this point, however, we determine the coefficients $a_3$, $a_2$, $a_1$ and $a_0$ of a second, least square error, best fit, 3rd order polynomial x(P) that approximates the curve of FIG. 10. The polynomial x(P) mathematically defines actual position x as a function of the demodulator output P, i.e.

$$x(P)=a_3P^3+a_2P^2+a_1P+a_0$$

The resulting coefficients $a_3$, $a_2$, $a_1$, and $a_0$ are the linearity compensation coefficients to be stored into the reserved image of the disk drive and made available to the servo firmware. Given a curve defined by a polynomial P(x) having the scaled gain coefficients defined above, the fully qualified polynomial x(P) that defines position x as a function of demodulator output P is:

$$x(P)=(1.864)P^3+(-0.347)P^2+(0.885)P+(0.021)$$

The code set forth in FIG. 10A is an example of a code fragment from servo firmware that uses the latter approach of polynomial coefficients defining x(P), wherein $a_3$, $a_2$, $a_1$, and $a_0$ appear as lincomp3, lincomp2, lincomp1, and lincomp0.

Benefits of the Invention

Figure 11A:
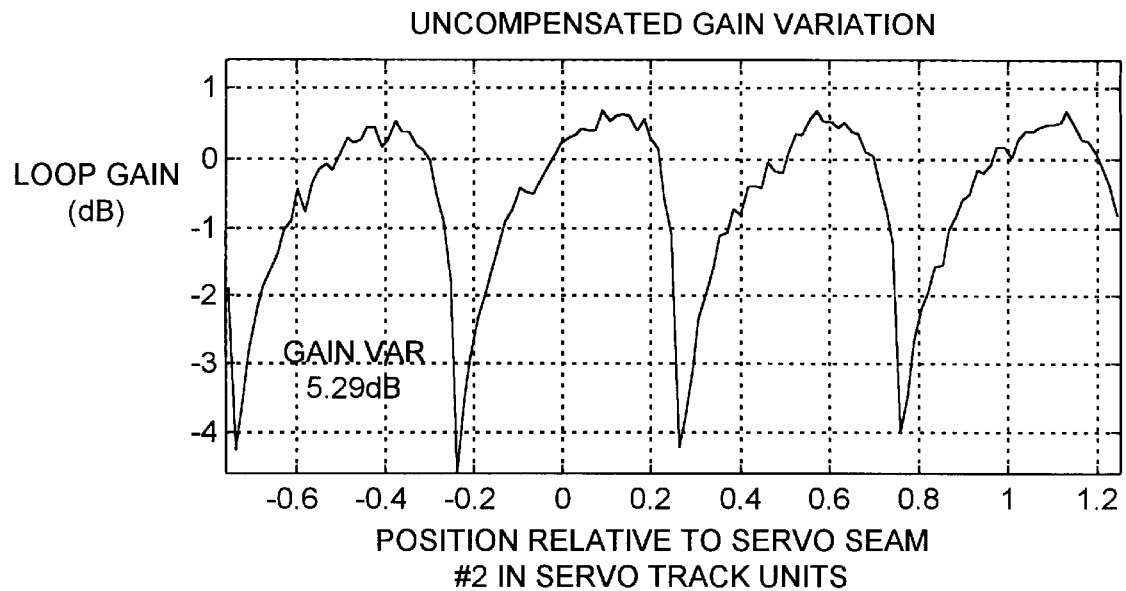
FIG. 11A is a graph of gain variation in a drive without compensation.
Figure 11B:
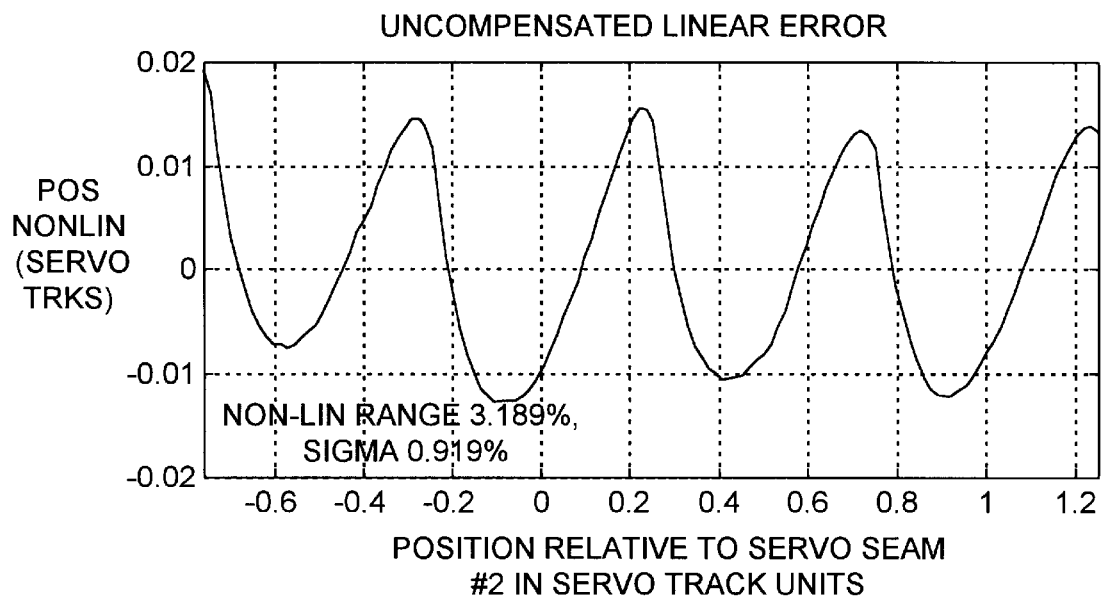
FIG. 11B is a graph of PES variation in a drive without compensation.
Figure 12A:
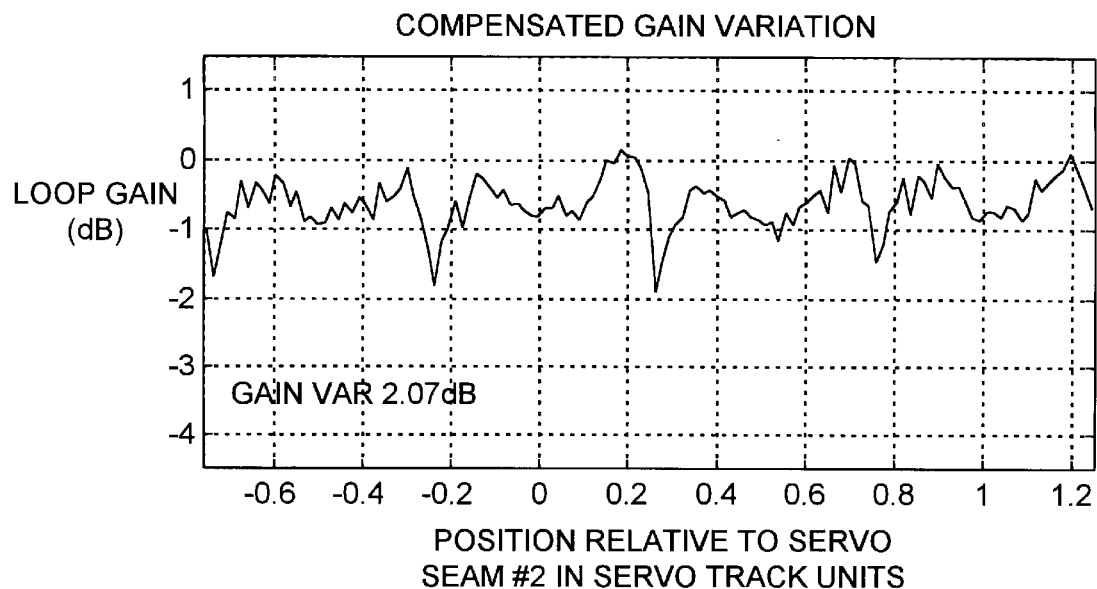
FIG. 12A is a graph showing how the gain variation is improved with compensation.
Figure 12B:
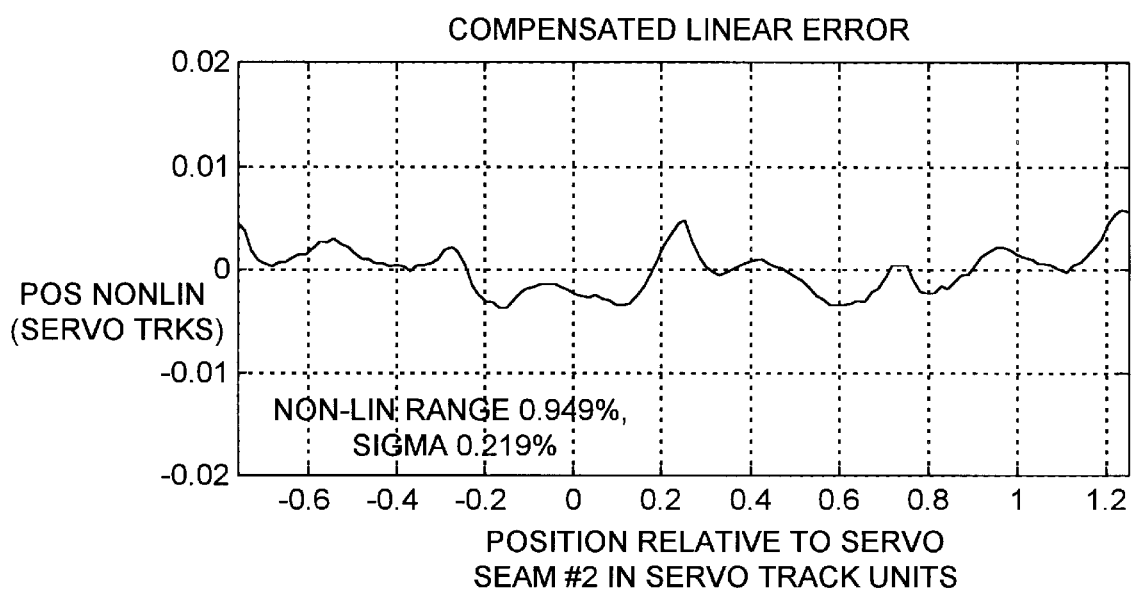
FIG. 12B is a graph showing how the PES variation is improved with compensation.

FIGS. 11A and 11B are graphs of gain variation and PES variation without compensation. FIGS. 12A and 12B, on the other hand, show the same measurements made in a drive with compensation. These figures clearly show that the gain variation due to the head's nonlinear read profile is substantially reduced and that the resulting error in position determination is also reduced.

APPENDIX

The following set of VB and MATLAB (trademark of The Mathworks Incorporated) code fragments describe the details of one possible measurement process used to derive the linearization coefficients:
Note that this algorithm requires floating point arithmetic.

Measurement Locations 28 measurements are made at 5 cylinder locations across each disk.
The 28 track offset values for each cylinder are:

```
// track offset in data tracks
trk_off(0, 0) = -4041;   trk_off(0, 1) = -1214;   trk_off(0, 2) = 1614;   trk_off(0, 3) = 4442;
trk_off(1, 0) = -3653;   trk_off(1, 1) = -825;    trk_off(1, 2) = 2002;   trk_off(1, 3) = 4830;
trk_off(2, 0) = -3265;   trk_off(2, 1) = -437;    trk_off(2, 2) = 2391;   trk_off(2, 3) = 5219;
trk_off(3, 0) = -2876;   trk_off(3, 1) = -49;     trk_off(3, 2) = 2779;   trk_off(3, 3) = 5607;
trk_off(4, 0) = -2488;   trk_off(4, 1) = 340;     trk_off(4, 2) = 3168;   trk_off(4, 3) = 5995;
trk_off(5, 0) = -2100;   trk_off(5, 1) = 728;     trk_off(5, 2) = 3556;   trk_off(5, 3) = 6384;
trk_off(6, 0) = -1711;   trk_off(6, 1) = 1117;    trk_off(6, 2) = 3944;   trk_off(6, 3) = 6772;
```

The 5 cylinder locations are:

```
cyl_seek(0) = 0;
cyl_seek(1) = 1675;
cyl_seek(2) = 3350;
cyl_seek(3) = 5025;
cyl_seek(4) = 6700;
```

Gain measurement

Gain is measured using the servo firmware command described in the following sendDiagnostic:

```
Const injectAmp& = 0.02 * 16384       'amplitude = x * 16384 where x in tracks
Const injectFreq& = 4.5 * 120         'freq = x * 120 where x in spindle harmonics
r = nativeBode_ASPI(SCSIAdapter, SCSIDeviceAddr, 1, 0,
       BodeMag, BodeFreq, 16, readBufferAddr, senseBufferAddr, SCSItimeout)
```

Open loop gain is calculated by the servo firmware. The inverse of the gain is stored in servo RAM. The sequence of how gain is measured is defined in the following VB code.

```
For cyl = 0 To numcyls
    r% = seeknative2(head, cyl_seek(cyl), 0)
    For STWtrk = 0 To 3                            'do each of 4 STW tracks
        r% = trackOffSet(trk_off(3, STWtrk))       'go to the middle of each STW track
        r% = servo_read(forceRROAddr)
        r% = servo_write(forceRROAddr, r% And &HFEFF)      'turn off RRO tracker
        oddEven = CLng(CDbl((cyl_seek(cyl)) + (trk_off(3, STWtrk) / 8192)) * 3) Mod 2
        For N = D To numpoints            ' scan across each STW track
            r% = trackOffSet(trk_off(N, STWtrk))
            If oddEven = 0 Then
                r% = servo_write(forceburstAddr, 2)    'set up for C-D only track following
            Else
                r% = servo_write(forceburstAddr, 1)    'set up for A-B only track following
            End If
            OL(datapoints) = get_gain(injectAmp, injectFreq)
            datapoints = datapoints + 1
        Next N
        r% = servo_read(forceRROAddr)
        r% = servo_write(forceRROAddr, r% Or &H100)        'turn on RRO tracker
    Next STWtrk
Next cyl
'==================================================================
' Call bode F/W routine and determine Open Loop gain
' retry if necessary, return a -1 if measurement fails
'==================================================================
Private Function get_gain#(injectAmp&, injectFreq&)
Const hd_addr& = &H227
Const cyldestAddr& = &H39C
Const SUBaddr& = &H292
Const SSWaddr& = &H28A
Const WUSaddr& = &H290
Const invGainAddr& = &H378
Const OK% = 99
Dim r%, retry%
Dim WUScnt&, SSWcnt&, SUBcnt&
    retry = 0
    retryTrk = 0
    While retry < 40
        retry = retry + 1
        retryTrk = retryTrk + 1
        if retryTrk > 9 then
            retryTrk = 0
            head& = servo_read(hd_addr)
            cyl& = servo_read(cylDesAddr)
```

APPENDIX-continued

```
            r% = seeknative2(head&, cyl& + 4, 1)    '----seek over 4 servo tracks-----
        endif
        r% = servo_write(substAddr, 0)
        r% = servo_write(SSWTOaddr, 0)
        r% = servo_write(WUSaddr, 0)
        r% = Bode_Plot(injectAmp, injectFreq, 0, 1)
        If r% <> 0 Then
            display_text "Bad return measuring gain. rc = " + r%
        Else
            SSWcnt = servo_read(SSWaddr)
            SUBcnt = servo_read(SUBaddr)
            if (SSWcnt > 0) or (SUBcnt > 0) then
                display_text "TID errors: SSWcnt = " + str$(SSWcnt) + " SUBcnt = " str$(SUBcnt)
            end if
            WUScnt = servo_read(WUSaddr)
            If WUScnt > 0 Then
                display_text "WUS detected measuring gain. WUS count = " + Str(WUScnt)
            Else
                retry = OK
            End If
        End If
    Wend
    If retry = OK Then
        get_gain# = 16384 / servo_read(invGainAddr)     'invGain_6 in 2, 14 format
    Else
        get_gain# = -1
    End If
End Function
```

Gain curve fit

The gain measurements are averaged by doing a least square fit to a
3rd order polynomial. The following code is in MATLAB syntax.

```
%--------generate the x position values------------
x = [  -0.2400   -0.2222   -0.2044   -0.1867
       -0.1689   -0.1511   -0.1333   -0.1156
       -0.0978   -0.0800   -0.0622   -0.0444
       -0.0267   -0.0089    0.0089    0.0267
        0.0444    0.0622    0.0800    0.0978
        0.1156    0.1333    0.1511    0.1689
        0.1867    0.2044    0.2222    0.2400   ];
xdata = [x x x x x ];
%----Calculating the 3rd order least squares fit----
atP = zeros (4, 1);
for n = 1 : length(xdata),
    atP(1) = atP(1) + openloop(n) .* xdata(n)^3;     %openloop is the measurment data
    atP(2) = atP(2) + openloop(n) .* xdata(n)^2;
    atP(3) = atP(3) + openloop(n) .* xdata(n);
    atP(4) = atP(4) + openloop(n);
end;
AtI = [
-6.5991292408    0.7793257389    0.1614144685   -0.0089285714
 1.9289762396    0.1665225938   -0.1299792046    0.0037087912
 3.5954995347   -0.2331316313   -0.1672158371    0.0119505495
 1.2972647226   -0.4196369363   -0.0573089198    0.0157967033
-2.0869041189   -0.3929933213    0.0927280566    0.0152472527
-3.6661829116   -0.1532007863    0.1758816013    0.0103021978
-0.5527475774    0.2997406688    0.0851382234    0.0009615385
-3.6661829116    0.6061422414    0.0588865274   -0.0053571429
 2.8765435152    0.0466263263   -0.1589353708    0.0061813187
 3.2826437762   -0.2997406688   -0.1493536011    0.0133241758
 0.4399419494   -0.4329587438   -0.0193816542    0.0160714286
-2.7637378872   -0.3530278988    0.123966979     0.0144230769
-3.4405716555   -0.0599481338    0.1736788078    0.0083791209
 1.2972647226    0.4462805513    0.0227403413   -0.0020604396
-1.2972647226    0.4462805513   -0.0227403413   -0.0020604396
 3.4405716555   -0.0599481338   -0.1736788078    0.0083791209
 2.7637378872   -0.3530278988   -0.123966979     0.0144230769
-0.4399419494   -0.4329587438    0.0193816542    0.0160714286
-3.2826437762   -0.2997406688    0.1493535011    0.0133241758
-2.8765435152    0.0466253263    0.1589353708    0.0061813187
 3.6661829116    0.6061422414   -0.0588865274   -0.0053571429
 0.5527475774    0.2997406688   -0.0851382234    0.0009615385
 3.6661829116   -0.1532007863   -0.1758816013    0.0103021978
 2.0869041189   -0.3929933213   -0.0927280566    0.0152472527
-1.2972647226   -0.4196369363    0.0573089198    0.0157967033
-3.5984995347   -0.2331316313    0.1672158371    0.0119505495
-1.9289762396    0.1665225938    0.1299792046    0.0037087912
 6.5991292408    0.7793257389   -0.1614144685   -0.0089285714   ];
```

APPENDIX-continued

```
//-----Calculate the 3rd order coefficients for the gain fit
for n = 1:28,
For n = 0 : 28 : (28*4),
    For m = 1:28,
        cg(1) = cg(1) + AtA(m,1) * OL(n + m)
        cg(2) = cg(2) + AtA(m,2) * OL(n + m)
        cg(3) = cg(3) + AtA(m,3) * OL(n + m)
        cg(4) = cg(4) + AtA(m,4) * OL(n + m)
    Next M
Next N
```

Generate Position Equation from Gain Equation

The coefficients "cg" define a polynomial that fits the gain data. To get an equation that defines position this polynomial is numerically integrated and scaled, the resulting coefficients are labeled "cp".

```
sf = 1/(cg(2)/48 + cg(4));  // calculate the scale
cp(1) = sf * 1/4 * cg(1);   // cp( ) are the PES coefficients
cp(2) = sf * 1/3 * cg(2);
cp(3) = sf * 1/2 * cg(3);
cp(4) = sf * cg(5);
cp(5) = sf * (-cg(1) - cg(3))/1024 ;
```

Calculation of linearity coefficients

After the 4th order polynomial for PES(x) is determined, a new equation is calculated for X(P). This is done by Fitting a 3rd order polynomial to the data a several points. (Note the following is MATLAB code)

```
//------Fit a 3rd order polynomial to the integrated gain data at 7 points---------
x4 = [ -0.27 -0.20 -0.10 0.0 0.10 0.20 0.27 ];
P4 = cp(1)*x4.^4 + cp(2)*x4.^3 + cp(3)*x4.^2 + cp(4)*x4 + cp(5)
Pa = zeros(4,4);
Pa(1,1) = sum(P4.^6)
Pa(1,2) = sum(P4.^5)
Pa(2,1) = Pa(1,2);
Pa(1,3) = sum(P4.^4)
Pa(2,2) = Pa(1,3)
Pa(3,1) = Pa(1,3)
Pa(1,4) = sum(P4.^3)
Pa(2,3) = Pa(1,4)
Pa(3,2) = Pa(1,4)
Pa(4,1) = Pa(1,4)
Pa(2,4) = sum(P4.^2)
Pa(3,3) = Pa(2,4)
Pa(4,2) = Pa(2,4)
Pa(3,4) = sum(P4)
Pa(4,3) = Pa(3,4)
Pa(4,4) = length(P4)
aI = inv(Pa);           // See VB code gain_lin2.bas for routine
                        // to do an inversion of a 4th order matrix.
c(1) = aI(1,1)*sum(P4.^3.*x4) + aI(1,2)*sum(P4.^2.*x4) + aI(1,3)*sum(P4.*x4) + aI(1,4)*sum(P4);
c(2) = aI(2,1)*sum(P4.^3.*x4) + aI(2,2)*sum(P4.^2.*x4) + aI(2,3)*sum(P4.*x4) + aI(2,4)*sum(P4);
c(3) = aI(3,1)*sum(P4.^3.*x4) + aI(3,2)*sum(P4.^2.*x4) + aI(3,3)*sum(P4.*x4) + aI(3,4)*sum(P4);
c(4) = aI(4,1)*sum(P4.^3.*x4) + aI(4,2)*sum(P4.^2.*x4) + aI(4,3)*sum(P4.*x4) + aI(4,4)*sum(P4);
OneTrk = 4096
lincomp3 = c(1) * OneTrk;       // convert the number to a 3, 13 fixed point value
lincomp2 = c(2) * OneTrk;
lincomp1 = (c(3) - 1) * OneTrk;
lincomp0 = c(4) * OneTrk;
lincomp0 through lincomp3 are the coefficients to load into the reserved image.
```

Test Limits

If the linearity coefticients are too large the coefficients will wrap around when converted to 16 bit fixed math. Therefore a check must be made to insure this does not occur. The correction polynomial should be zero, or close to zero, at the ± quarter track points. So a check can be performed to evaluate the polynomial at these points to make sure that nothing went wrong in the math.
Example code:

```
COMP_LIM = 4096*.03;
comp_plus_qtr = lincomp3/64 + lincomp2/16 + lincomp1/4 + lincomp0
comp_minus_qtr = -lincomp3/64 + lincomp2/16 + -lincomp1/4 + lincomp0
fail = false;
if abs(comp_plus_qtr) > COMP_LIM then fail = true;
if abs(comp_minus_qtr) > COMP_LIM then fail = true;
if fail then
    display_text "Failure! lin coefficients are hosed for head " + str(head&)
endif
```

APPENDIX-continued 40 retries are allowed for each gain measurement location. There are 10 retries and if a clean measurement can not be made, then the actuator is moved over 4 data tracks and the measurement is repeated.

We claim:

1. A method of characterizing the nonlinearity of a head in a magnetic disk drive having a rotating recording surface, wherein the head is positioned by a sampled servo positioning system in which each recording surface has multiple circumferentially successive servo wedges that each have a sequence of servo bursts, wherein during track following operations the head produces an amplitude signal when a portion of a servo burst passes under the head in order to provide a component of a position error signal, and wherein the amplitude signal produced by the head varies nonlinearly with position as the head is positioned over differing portions of the servo burst, the method comprising:

positioning the head at a plurality of off-track positions relative to a burst pair centerline of a pair of servo bursts;

measuring the open loop gain for each of the plurality of off-track positions to provide a distribution of open loop gain values;

determining a first plurality of coefficients of a first polynomial equation of order (n) that approximates the distribution of open loop gain values corresponding to the off-rack positions wherein (n) is an integer of at least magnitude 2;

integrating the first polynomial equation of order (n) to produce a second polynomial equation of order (n+1) that approximates position error as a function of off-track position; and finding a third polynomial equation of order (n+1) to provide off-track position as a function of demodulator output.

2. The method of claim 1 wherein the step of determining the first plurality of coefficients of the $(n)^{th}$ order polynomial equation is accomplished according to a least squared error method.

3. The method of claim 1 wherein n equals 2 such that the polynomial equation may approximate a distribution of open loop gain values that resemble an inverted parabola that is symmetrical.

4. The method of claim 1 wherein n equals 3 such that the polynomial equation may approximate a distribution of open loop gain values that resemble an inverted parabola that is asymmetrical.

5. The method of claim 1 wherein the step of inverting the second polynomial equation of order (n+1) is accomplished by providing a lookup table in a memory containing a plurality of off-track positions as a function of corresponding position errors.

6. The method of claim 1 wherein the step of inverting the second polynomial equation of order (n+1) is accomplished by:

generating a plurality of off-track position values;

using the second polynomial equation to calculate a plurality of position error solutions corresponding to the plurality of off-track position values;

determining a second plurality of coefficients of a third polynomial equation of order (n) that approximates a distribution the off-track positions relative to the corresponding position error solutions; and storing the second plurality of coefficients of the third polynomial equation for mathematically deriving an off-track position given a position error.

7. The method of claim 1 comprising the further step of scaling the second polynomial equation of order (n+1) that approximates position error as a function of off-track position to units of servo tracks.

8. The method of claim 7 wherein n equals 3 such that the first polynomial equation that approximates the distribution of open loop gain values may be characterized as $G(x) = g_3 x^3 + g_2 x^2 + g_1 x + g_0$, the second polynomial equation that approximates position error may be characterized as $$P(x) = sf\left(\frac{1}{4}g_3 x^4 + \frac{1}{3}g_2 x^3 + \frac{1}{2}g_1 x^2 + g_0 x + c_0\right)$$

where sf is a scaling factor and $c_0$ is a constant, and wherein the scaling step is accomplished by solving for the scaling factor sf and the constant $c_0$ based on a pair of simultaneous equations relating to a bulk gain calibration which sets a position error value equal to a first predetermined value at a first commutation point $x_1$ and sets a position error value equal to a second predetermined value over a change in position between the first commutation point and a second commutation point $x_2$.

9. The method of claim 8 wherein the first commutation point $x_1 = 0.25$ of a servo track pitch, wherein the second commutation point $x_2 = -0.25$ of a servo track pitch, and wherein the pair of simultaneous equations are:

$$0.25 = P(0.25);$$

and $$0.5 = P(0.25) - P(-0.25),$$

such that:

$$sf = 48/(g_2 + 48 g_0); \text{ and } c_0 = (-g_3 - 32 g_1)/1024.$$

10. The method of claim 1 wherein the step of measuring the open loop gain for each of the plurality of off-track positions to provide a distribution of open loop gain values is accomplished by:

positioning the head at each off-track position;

injecting a signal having a known frequency and a known amplitude relative to a portion of a servo track to the sampled servo positioning system to produce a position error signal at the off-track position;

measuring a portion of the position error signal containing the injected signal to calculate closed loop gain; and calculating the open loop gain from the closed loop gain.

11. The method of claim 1 wherein the positioning and measuring steps are performed with respect to a group of adjacent burst pair centerlines.

12. The method of claim 11 wherein the group of adjacent burst pair centerlines are defined by a constituent portion of the servo bursts that may be repeated to form an overall pattern of servo bursts.

13. The method of claim 12 wherein the constituent portion of servo bursts defines four burst pair centerlines.

14. The method of claim 12 wherein the positioning and measuring steps are performed with respect to a plurality of groups of servo bursts at a corresponding plurality of locations on the recording surface.

15. The method of claim 14 wherein the plurality of groups of servo bursts and corresponding plurality of locations comprises five groups of servo bursts and five corresponding locations.

16. In a disk drive having a sampled servo head positioning system including a processor, a memory, a head, a rotating recording surface wherein each recording surface has multiple circumferentially successive servo wedges that each have a sequence of servo bursts, wherein during track following operations the head produces a burst amplitude signal when a portion of a servo burst passes under the head in order to provide a component of a position error signal, and wherein the burst amplitude signal produced by the head varies nonlinearly with position as the head is positioned over differing portions of the servo burst, a method of correcting for the nonlinear variation of the burst amplitude signal comprising:

providing a plurality of compensation coefficients $a_n \ldots a_1$ of a polynomial compensation equation $x(P)=a_n P^n + \ldots + a_1 P$ of order (n) that produces a corrected off-track position x as a function of a nominal position error signal P;

obtaining the nominal position error signal P based on at least two burst amplitude signals;

determining the corrected off-track position x corresponding to the nominal position error signal P by solving the polynomial equation x(P) using the nominal position error signal P; and applying the corrected off-track position to the sampled servo head positioning servo system to position the head to follow a track at a desired off-track position relative thereto.

17. The method of claim 16 wherein the polynomial compensation equation x(P) is of order 3 such that $x(P)=a_3 P^3 + a_2 P^2 + a_1 P^1 + a_0$.

* * * * *